United States Patent
Decker et al.

(10) Patent No.: US 11,989,187 B2
(45) Date of Patent: May 21, 2024

(54) TAG MANAGEMENT FOR DISTRIBUTED APPLICATIONS

(71) Applicant: SAP SE, Walldorf (DE)

(72) Inventors: Michael Decker, Graben-Neudorf (DE); Susanne Gottlieb, Karlsruhe (DE); Mike Luang-Khot, Heidelberg (DE); Steffen Maier, Mauer (DE); Arthee Pranadharthi Haran, Untergrombach-Bruchsal (DE); Pradeep Rathod, Heidelberg (DE); Philipp Thiele, Hamburg (DE); Mathias Zietzschmann, Sandhausen (DE)

(73) Assignee: SAP SE, Walldorf (DE)

(*) Notice: Subject to any disclaimer, the term of this patent is extended or adjusted under 35 U.S.C. 154(b) by 85 days.

(21) Appl. No.: 17/730,735

(22) Filed: Apr. 27, 2022

(65) Prior Publication Data

US 2023/0350902 A1  Nov. 2, 2023

(51) Int. Cl.
*G06F 16/2457* (2019.01)
*G06F 16/22* (2019.01)
*G06F 16/27* (2019.01)
*G06F 16/28* (2019.01)
*H04L 67/133* (2022.01)

(52) U.S. Cl.
CPC .... *G06F 16/24573* (2019.01); *G06F 16/2255* (2019.01); *G06F 16/2291* (2019.01); *G06F 16/275* (2019.01); *G06F 16/288* (2019.01); *H04L 67/133* (2022.05)

(58) Field of Classification Search
CPC .......... G06F 16/24573; G06F 16/2255; G06F 16/2291; G06F 16/275; G06F 16/288; H04L 67/133
See application file for complete search history.

(56) References Cited

U.S. PATENT DOCUMENTS

| | | | | |
|---|---|---|---|---|
| 8,572,161 B2* | 10/2013 | Gill | ........................ | G06F 9/542 707/602 |
| 9,537,889 B2* | 1/2017 | Kuehnel | ............. | H04L 63/1458 |
| 9,753,898 B1* | 9/2017 | Glommen | ............. | G06F 16/958 |
| 9,762,681 B2* | 9/2017 | Na | ......... | G06F 9/5072 |
| 9,785,528 B2* | 10/2017 | Qu | ...... | G06F 13/1689 |
| 11,853,260 B2* | 12/2023 | Watanabe | ............. | G06F 16/144 |
| 2008/0243641 A1* | 10/2008 | Leno | ...................... | G06Q 30/06 705/16 |
| 2009/0235167 A1* | 9/2009 | Boyer | ................... | G06Q 10/10 715/708 |
| 2009/0235185 A1* | 9/2009 | Gill | ......................... | G06F 9/542 715/760 |
| 2011/0213840 A1* | 9/2011 | Boyer | ................... | G06F 16/958 709/205 |

(Continued)

*Primary Examiner* — Huawen A Peng
(74) *Attorney, Agent, or Firm* — SCHWEGMAN LUNDBERG & WOESSNER, P.A.

(57) ABSTRACT

In an example embodiment, a data model, software architecture, and process for synchronizing information about tags is provided, that permits assignment between different microservices. When a tag is added to an entity, then an assignment is made. The assignment is a record that contains a reference to a unique identifier for the tag and also describes the entity's domain and entity type. Each service uses at least one distinct domain, so tag assignments from different services should not conflict with one another.

20 Claims, 9 Drawing Sheets

(56) References Cited

U.S. PATENT DOCUMENTS

| | | | | |
|---|---|---|---|---|
| 2013/0144879 A1* | 6/2013 | Kuehnel | ................. | H04L 47/34 |
| | | | | 707/736 |
| 2015/0081899 A1* | 3/2015 | Qu | ................. | G06K 19/00 |
| | | | | 709/224 |
| 2015/0381744 A1* | 12/2015 | Na | ................. | H04L 67/51 |
| | | | | 709/203 |
| 2016/0117291 A1* | 4/2016 | Caten | ................. | G06F 40/205 |
| | | | | 715/239 |
| 2016/0299986 A1* | 10/2016 | Qu | ................. | G06Q 10/06 |
| 2017/0270085 A1* | 9/2017 | Dodeja | ................. | G06F 16/986 |
| 2018/0159943 A1* | 6/2018 | Poon | ................. | H04L 67/63 |
| 2019/0266211 A1* | 8/2019 | Watson | ................. | G06F 16/958 |
| 2021/0117387 A1* | 4/2021 | Smith | ................. | G06F 16/184 |

* cited by examiner

TAG MANAGEMENT FOR DISTRIBUTED APPLICATIONS

TECHNICAL FIELD

This document generally relates to microservice software environments. More specifically, this document relates to intelligent asynchronous data exchange across microservices in a distributed environment.

BACKGROUND

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany. Another example is Cloud Application Lifecycle Management (CALM)®, from SAP SE of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
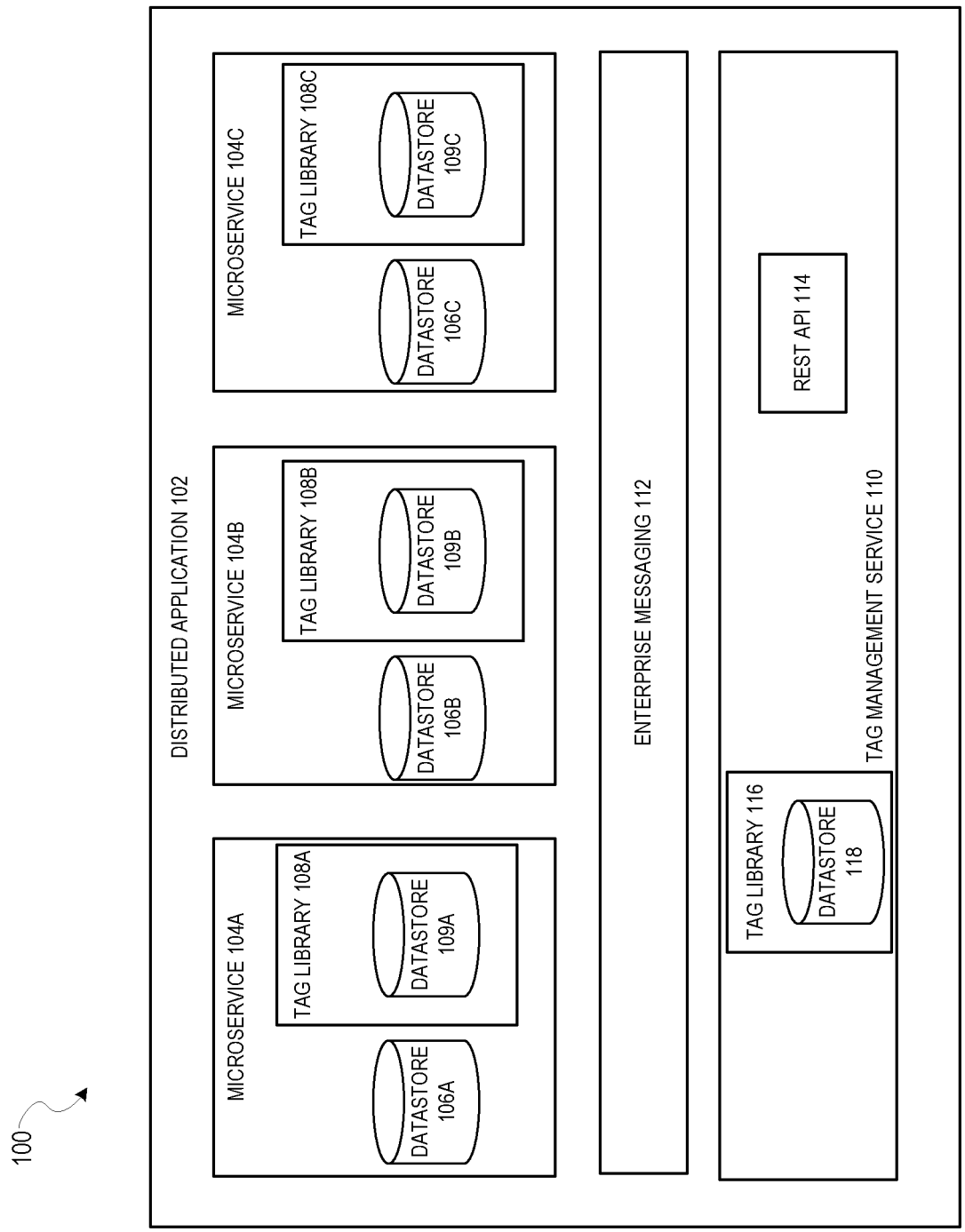
FIG. 1 is a block diagram illustrating a system for tag management, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Microservice applications may tag entities, which are data objects managed by the applications, with tags, which are short texts or keywords. There are several advantages of tagging entities, including providing contextual information to the entities, allowing filtering (e.g., to display all entities that have a particular set of tags assigned or not assigned), navigation to related entities (e.g., entities that have the same tags assigned), and counting entities. Tags can also contain other attributes in addition to a keyword or phrase, such as a description of a tag's meaning or a link to a web page. Examples of tags in a personal information management (PIM) application are "Private," "Business," "Project 123," or "Plant Berlin."

Microservice applications are often created by different software producers, or at least different divisions or groups within a software producer. The result is that tags created for one microservice application may be different than tags created for another microservice application, despite sharing an underlying meaning.

One example implementation may be a distributed system, such as a set of loosely coupled services that might run on different servers. Each of these services may have its own data store and run in its own process. For example, in a PIM environment, one service may be a calendar, one service an address book, one service notes, and one service tasks. It may be desirable, however, to hide the fact that these services are actually separate services from the user, and instead imply that the services are all simply portions of a larger PIM service. Yet, each of the services may have its own set of tags and tag definitions that may be contradictory with one another.

One solution would be to have tag management components within each service announce new tags to other services, essentially allowing the synchronization of tags across separate services. Such announcements, however, would need to be performed in near real-time in order to be effective, because a user may navigate to another view of what is perceived as one application but that is provided by another service, and the tags would need to be quickly synchronized to avoid any errors.

Additionally, not only would new tags need to be announced, but changes to tags (e.g., renaming a tag) and changes to tag properties (e.g., changing a tag description or web page link) would also need to be announced. Furthermore, if any of these announcements fails, such as due to network problems causing a tag announcement to fail to reach another microservice, then the set of tags available at the microservices will be inconsistent.

Furthermore, the data model of such tags should be capable of being used in different services. For example, the tag "Project-123" created and assigned in the service "Calendar" to an entity of type "Meeting" should also be offered in service "Address Book" for assignment to an entity of type "Contact."

In an example embodiment, a data model, software architecture, and process for synchronizing information about tags is provided that permits assignment between different microservices. When a tag is added to an entity, then an assignment is made. The assignment is a record that contains a reference to a unique identifier for the tag and also describes the entity's domain and entity type. Each service uses at least one distinct domain, so tag assignments from different services should not conflict with one another.

Generally, an assignment describes that a particular tag was added to a particular entity. An entity may be described by a domain attribute, which is specific for a microservice, along with an entity type and entity identification. Examples of entity types are projects and tasks.

The architecture comprises a tag library and a tag management service. The tag library is embedded into all services of an application that want to offer tagging. It also contains a separate data store for storing tags and assignments of entities to tags. A service then communicates via an application program interface (API) with the tag library, such as by querying the list of all tags or assigning a particular tag to an entity. The tag management service also embeds the tag library, to which some additional functions, as will be describe later, can be added.

When any of the services makes a write operation to the tag library (e.g., creation of a tag or assignment), then the updated tag information is announced to all other instances of the tag library, including the tag management service. A technology for asynchronous 1-to-N messaging, also called Enterprise Messaging (EM), may be used for this purpose. EM provides asynchronous messaging between different microservices of a distributed application. A message sent via EM may be delivered to several microservices. Usually, it only takes a few seconds until an EM message is delivered. Examples of EM products include Kafka and implementations of the Java Message Service (JMS), such as OpenJMS and OpenMQ. Since EM is asynchronous, the calling service is not blocked until the message is delivered at all the receiving services.

Each tag library receiving the announcement will update its data store accordingly. Sending and receiving messages via the EM may also be implemented in the tag library.

Furthermore, in an example embodiment, a process for self-healing is provided to ensure belated data consistency between all instances of the tag library, in case individual messages on the EM get lost. A Representational State Transfer (REST) API may be provided by the tag management service, which can be called by services to supplement their data store information.

FIG. 1 is a block diagram illustrating a system 100 for tag management, in accordance with an example embodiment. Here, the system 100 includes a distributed application 102 with a plurality of different microservices 104A, 104B, 104C. Each microservice has a data store 106A, 106B, 106C, respectively, and tag library 108A, 108B, 108C. Each tag library 108A, 108B, 108C may also have its own internal data store 109A, 109B, 109C, respectively. Having a separate internal data store 109A, 109B, 109C for tag information allows the tag library 108A, 108B, 108C to be reusable and eliminates the need for dedicated fields or tables to be added to microservice data stores 106A, 106B, 106C.

A distributed application is an application comprising a plurality of microservices running on different physical or visual machines/servers. These microservices interact with each other via a (local) network. Each microservice of the distributed application using a tag library may define a domain. The domain is an internal identifier, which can be considered as a namespace for all entities created by the microservice.

The microservices 104A, 104B, 104C communicate with a tag management service 110 via EM 112, and through a REST API 114 of the tag management service. Tag management service 110 also contains a tag library 116 with its own data store 118.

On a periodic basis, such as each day at a particular time, the tag management service 110 may send a tag sync message via the EM 112 to all instances of the tag library 108A, 108B, 108C. This tag sync message contains information about all the tags and assignments currently stored by tag library 116 in the tag management service 110. In an example embodiment, to keep the size of the tag sync message small, this message contains hash values for tags and assignments. This helps reduce the possibility of issues in the EM 112 due to large message sizes.

Within the tag sync message, for each tag, a tag identification and a hash of all attributes of the tag are stored. For the assignments, a hash value for each domain is used. Specifically, for a given domain, all entities are sorted according to their type and identification, and then the assigned tags are added. The tags may also be sorted, such as by tag identification. The string obtained by these processes for the assignments can then be used as input to the hash algorithm.

In an example embodiment, MD5 may be used as the hash algorithm. It is not necessary to use a cryptographically secure hash algorithm. The following is an example of a payload of a tag sync message in JavaScript Object Notation (JSON) format, although one of ordinary skill in the art will recognize that other formals could be used, especially ones for semi-structured data such as Extensible Markup Language (XML) or Yet Another Markup Language (YAML):

```
{
    "tags": [
        {
            "tag_id": "096999ae-fffd-11eb-9a03-0242ac130003",
            "fingerprint": "e52e8e5d0beb7de33337a82b53e01152"
        },
        {
            "tag_id": "7270f169-3ae8-4631-874d-050f0594d819",
            "fingerprint": "830efchzjkzkzukiuikuiuicc8c2d0f"
        }
    ],
    "assignments": [
        {
            "domain": "tkm",
            "fingerprint": "830efcc73bd0a53487b6df58cc8c2d0f"
        },
        {
            "domain": "pm",
            "fingerprint": "830efccsfgsfgfsdgfgfgg58cc8c2d0f"
        }
    ]
}
```

The hash value for a given tag ID might be calculated as follows:

fingerprint:=md5(keyword∥description∥ . . . )

Where ∥ is string concatenation, e.g., "ab"∥"cd"="abcd".

The hash value for all assignments in a particular Domain can be calculated as follows:

fingerprint:=md5(<assignments1>∥<assignments2>∥ . . . )

The <assignment> substrings are built for a given pair of Entity Type and Entity ID, as follows:

```
<assignment1> :=
    <entity-type> ∥ <entity-id> ∥ <tagId1> ∥ <tagId2> ∥ ...
```

This means that a string is built, which starts with the Entity Type and then the Entity ID, followed by the IDs of all tags currently assigned to this entity.

To get a consistent input for hashing, the assignments are sorted in a particular order (e.g., alphabetically according to Entity Type and Entity ID), and the Tag IDs for each assignment are also sorted.

When an instance of the tag library 108A, 108B, 108C receives the tag sync message, it then identifies if it knows all the Tag identifications listed in the payload. If it does not know one or more of the Tag identifications, then it can send a Hypertext Transport Protocol (HTTP) request to the REST API 114 of the tag management service 110 to get the details about the missing tag(s) and to supplement it its datastore 106A, 106B, 106C. Notably, this is not performed via EM 112, and is synchronous rather than asynchronous communication. Further, if the tag is known, but the hash value of its attributes is different, then the same is done to overwrite the tag with the current state.

Furthermore, the receiving tag library 108A, 108B, 108C might also detect that it knows one or more tags that are not contained in the tag sync message. If such a tag has no more assignments, then it is deleted. However, if it has at least one assignment, then it should remain. In this case, the tag library 108A, 108B, 108C sends a message about these tags via EM 112, so the other instances of the Tag Library 108A, 108B, 108C and tag library 114 can add this tag. In this manner, the tag library 114 in the tag management service 110 can be updated if it is out of sync with the other tag libraries 108A, 108B, 108C.

Each tag library 108A, 108B, 108C also compares the assignments for its own domain (which can be found in its datastore) and the tag sync message. If differences in the hash value are found, then it calls the REST API 114 of the tag management service 110 to provide the correct assignments for its domain. The tag management service 110 then overwrites the assignment data for this domain with the data received via the REST API 114.

The functionality described above for self-healing is contained in the tag libraries 108A, 108B, 108C116.

The microservices 104A, 104B, 104C can use their corresponding tag libraries 108A, 108B, 108C to build a tag field as well as to search and filter tags in their entity list and detail view.

In an example embodiment, each tag library 108A, 108B, 108C, 116 contains a delimited text file, such as a CDS file format file, which contains data store definitions for a tag table and a tag assignment table and an API through which the tables can be accessed. The tables can also be accessed directly in a read mode to include the information in views.

Figure 2:
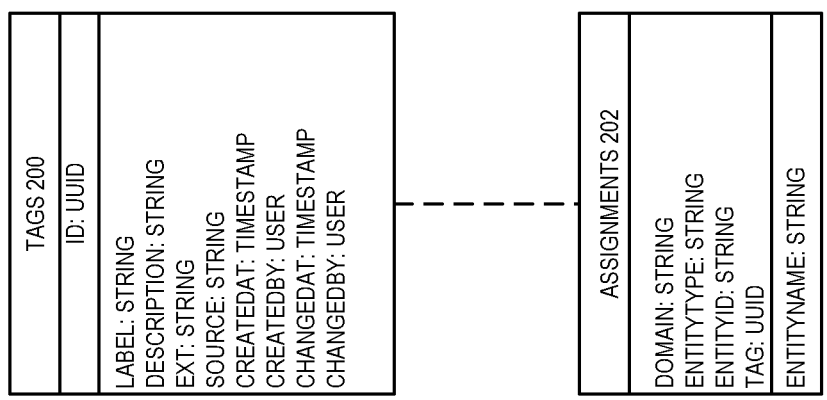
FIG. 2 is a diagram illustrating a tags entity and an assignments entity 202, in accordance with an example embodiment.

Each tag library 108A, 108B, 108C, 116 may also include two entities: a tags entity and an assignments entity. FIG. 2 is a diagram illustrating a tags entity 200 and an assignments entity 202, in accordance with an example embodiment. The entities 200, 202 may be accessed directly in a read-only mode (to, for example, include tags in object lists) or via an API in a change mode (to, for example, create tags or assignments).

The API offers methods to create and change tags, as well as to create and remove tag assignments. It may also contain read methods for the entities 200, 202.

The synchronization of tags may be mainly handled by asynchronous events. Whenever a tag is created, updated, assigned, unassigned, or deleted, a respective event will be fired that will be consumed by all consumers of the tag library that have subscribed to the corresponding event. There are three classes of consumers of the tag libraries:

(1) tag-only consumer—these are consumers that use the tag library only to assign tags to local entities and are not interested in the assignments of other domains. Such consumers are only interested in tag events (e.g., tag create, update, delete), and thus consume only events from corresponding topics. Each tag-only consumer holds a list of all tags existing in the distributed application, but only has a list of the assignments that it handles itself (its own domain assignments).

(2) tag and assignment consumers—these are consumers that are interested in both tag events and assignment events, specifically assignment events of other domains. Such consumers have a complete list of all tags existing in the distributed application and also a complete list of all assignments existing in the distributed application (i.e., including assignments from other microservices).

(3) central tag management—this is the tag management service (110 in FIG. 1). It also consumes all events like the tag and assignment consumers, but additionally manages self-healing of tag synchronization and provides management capabilities.

When a tag-only consumer calls an API method to create a tag, the tag is stored in a local tag buffer table and a tag creating event is sent to the EM. That event is consumed by all consumers, which update their own tag buffer table with the new tag.

When a tag-only consumer calls an API method to assign (or unassign) a tag, the assignment is stored/deleted in the local tag assignments table and an assignment or unassignment event is sent to the EM. That event is consumed only by consumers that are registered as an assignment consumer (e.g., not tag-only consumers).

Since the tag creation event is stored in a different queue than the tag assignment event, it is possible that the assignment event arrives at a destination prior to the tag creation event, but the present system is robust enough to handle such situations.

When there are no more assignments in the tag management service, a tag deletion process can be triggered to delete unused tags. Here, the tag management service sends out a tag deletion event to the EM, which will be consumed by all consumers. When receiving the event, the receiving tag library will check to ensure there are no assignments existing in its own local data store. If there are, they will be deleted.

In the event there is an assignment still existing in a tag-only consumer, it will notice this during the self-healing process and fire a tag creation event to recreate the tag in all consumers. The missing tag assignment will also be noticed and healed in the assignment consumers.

For tags that exist in microservice tag libraries as well as in the tag management service, the source of truth is the tag management service, such that tags are updated in the consumers from the tag management service. For tags that exist in the microservice tag libraries but not in the tag management service, the consumer determines whether it still needs that tag (e.g., there is an existing assignment in the local assignment buffer). According to that check, the tag is either deleted locally or recreated in the whole system.

For assignments, the source of truth is the microservice tag libraries and not the tag management service. This is why the assignments for a domain are completely overwritten in the tag management service if there is an inconsistency detected.

Thus, the system provides for three types of EM events and three types of REST calls. The EM events include a tag sync event, a tag created event, and a tag deleted event. The tag sync message is sent from the tag management service on a periodic basis, and may include a payload containing existing tag identifications and an MD5 hash value used as a fingerprint of the tag, from which changes to the tag can be detected. The tag sync message also contains a hash per assigned domain, so that consumers can detect if all their assignments are up-to-date in the tag management service.

The tag created event is an optional event that is sent when a tag is found in the tag buffer of a tag-only consumer, which was not part of the list sent by the tag sync event and there are still assignments to that tag in the tag-only consumer.

The tag deleted event is an optional event that is sent when a tag does not have any more assignments after a tag-only consumer has updated its assignment via an "update assignments" REST call to tag management.

The REST calls include get missing/changed tags, update assignments, and get assignments for domains that differ. All are optional. The get missing/changed tags call is made when the tag sync events contained tag identifications that are not found in the local buffer or if the fingerprint of the tags do not match the tags in the local buffer. This call gets only the relevant tags by providing their respective tag identifications.

The update assignments call is made by the tag-only consumer in the case that the hash of tag assignments stored in the local buffer differ from the hash of assignments for the respective domain sent by the tag sync event. It contains a list of all assignments stored in the local assignments.

The get assignments for domains that differ event is made by tag and assignment consumers in cases where the hash of tag assignments stored in the local buffer differs from the hash of assignments for a domain sent by the tag sync event. This is done for each domain individually that needs to be resynchronized.

Figure 3:
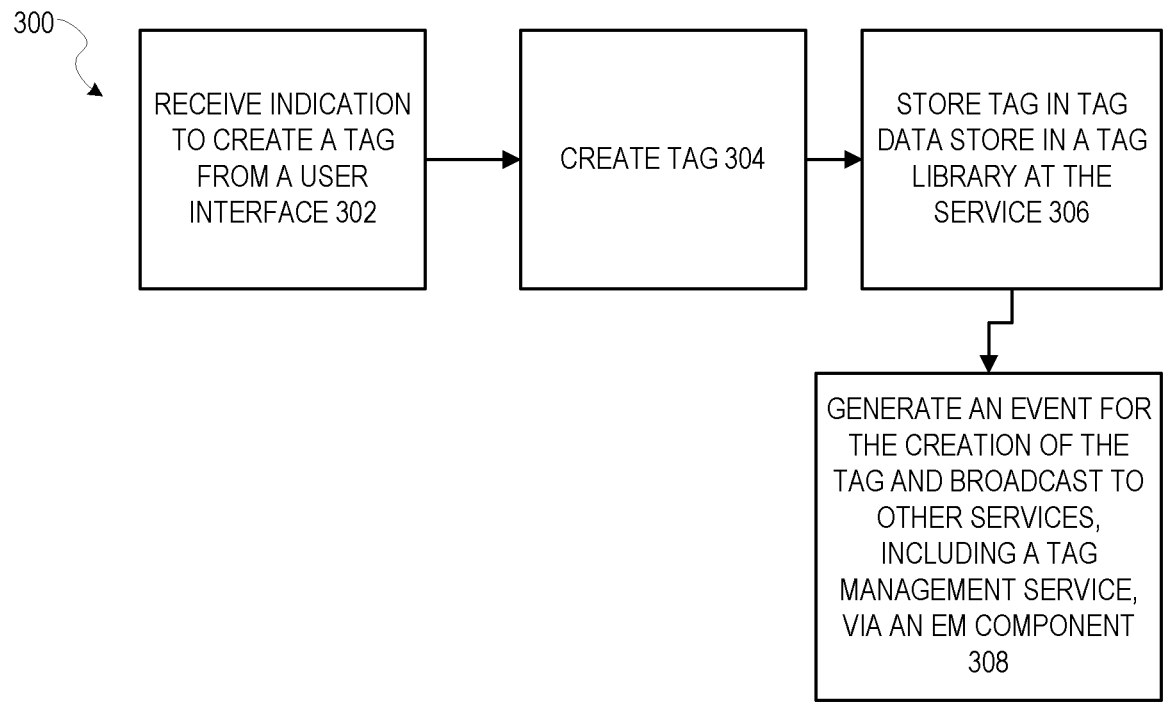
FIG. 3 is a flow diagram illustrating a method of creating a tag in a distributed application, in accordance with an example embodiment.

FIG. 3 is a flow diagram illustrating a method 300 of creating a tag in a distributed application, in accordance with an example embodiment. The method 300 may be performed at one service (e.g., a microservice) within the distributed application. At operation 302, an indication to create a tag is received from a user interface. This user interface may be associated with the service that is performing the method. At operation 304, the tag is created. At operation 306, the tag is stored in a tag data store in a tag library in the service. At operation 308, an event for the creation of the tag is generated and broadcast to other services, including a tag management service, of the distributed application via an EM component.

While not pictured, when the other services and the tag management service receive the event for the creation of the tag, they likewise create the tag locally and store it in their own respective tag library data stores.

Figure 4:
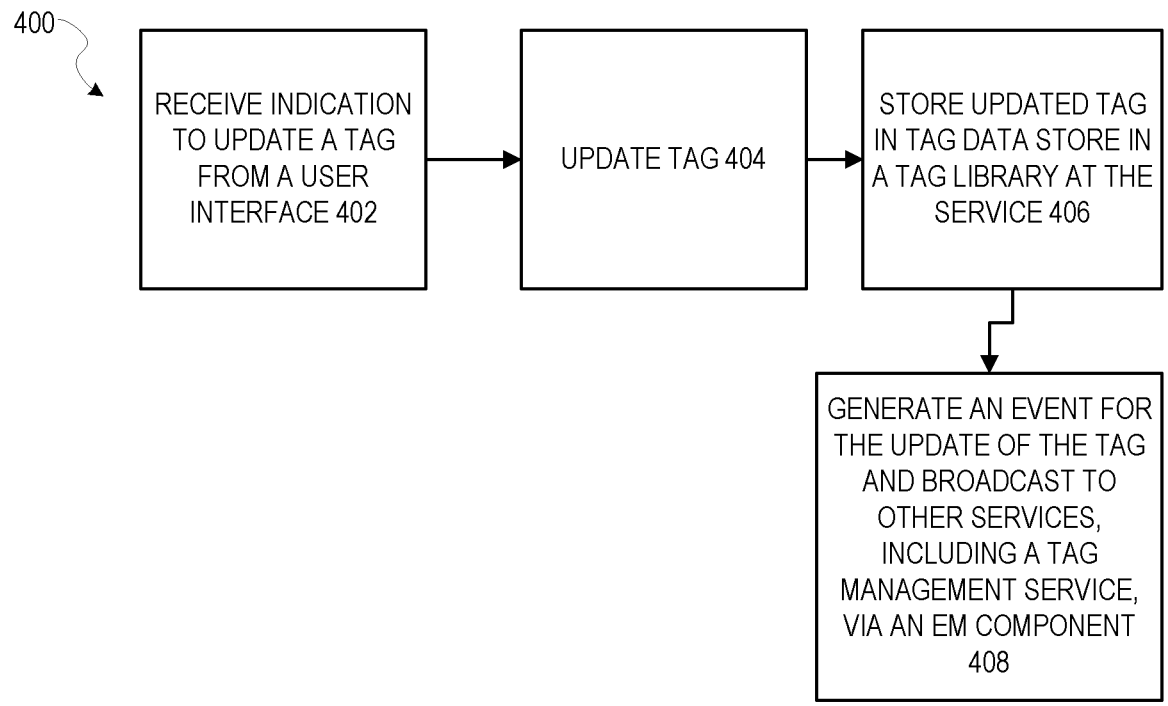
FIG. 4 is a flow diagram illustrating a method of updating a tag in a distributed application, in accordance with an example embodiment.

FIG. 4 is a flow diagram illustrating a method 400 of updating a tag in a distributed application, in accordance with an example embodiment. The method 400 may be performed at one service (e.g., a microservice) within the distributed application. At operation 402, an indication to update the tag is received from a user interface. This user interface may be associated with the service that is performing the method. At operation 404, the tag is updated. At operation 406, the updated tag is stored in a tag data store in a tag library in the service, overwriting the tag that has been updated. At operation 408, an event for the update of the tag is generated and broadcast to other services, including a tag management service, of the distributed application via an EM component.

While not pictured, when the other services and the tag management service receive the event for the update of the tag, they likewise update the tag locally and store it in their own respective tag library data stores.

Figure 5:
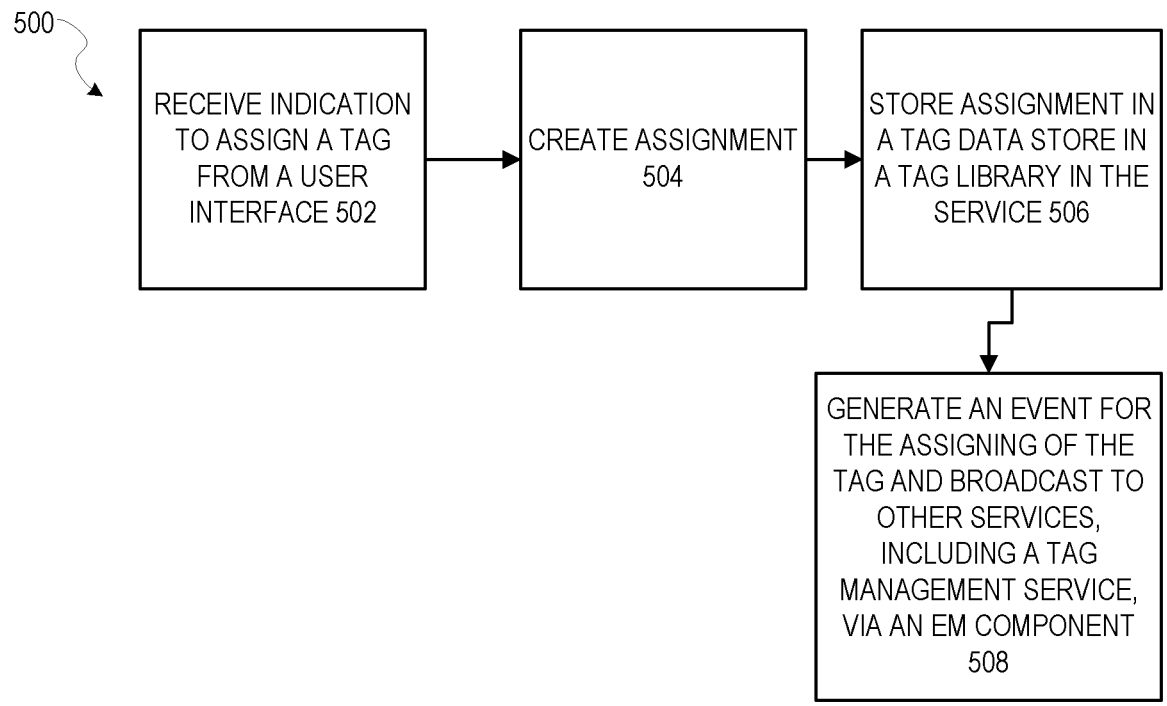
FIG. 5 is a flow diagram illustrating a method of assigning a tag in a distributed application, in accordance with an example embodiment.

FIG. 5 is a flow diagram illustrating a method 500 of assigning a tag in a distributed application, in accordance with an example embodiment. The method 500 may be performed at one service (e.g., a microservice) within the distributed application. At operation 502, an indication to assign a tag is received from a user interface. This user interface may be associated with the service that is performing the method. At operation 504, the assignment is created. At operation 506, the assignment is stored in a tag data store in a tag library in the service. At operation 508, an event for the assigning of the tag is generated and broadcast to other services, including a tag management service, of the distributed application via an EM component.

While not pictured, when the other services and the tag management service receive the event for the assignment, they likewise store the assignment locally in their own respective tag library data stores.

It should also be noted that is possible to assign a list of tags instead of just one tag using the same process, with the list of assignments being sent with the event.

Figure 6:
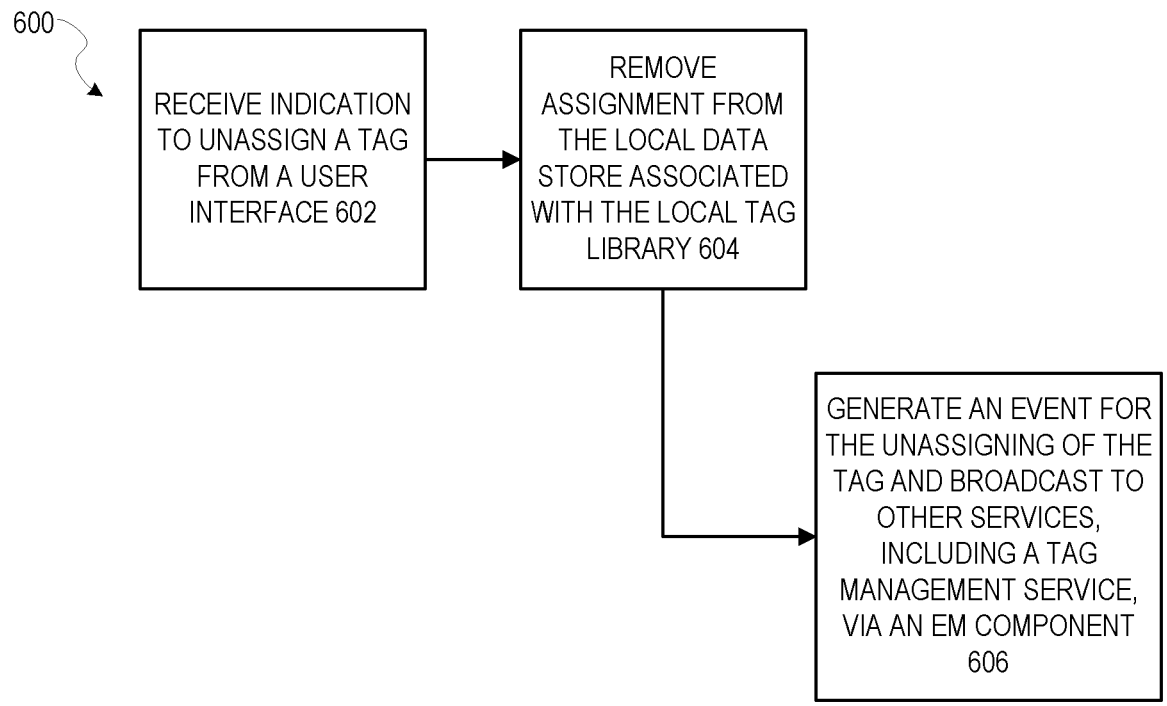
FIG. 6 is a flow diagram illustrating a method of unassigning a tag in a distributed application, in accordance with an example embodiment.

FIG. 6 is a flow diagram illustrating a method 600 of unassigning a tag in a distributed application, in accordance with an example embodiment. The method 600 may be performed at one service (e.g., a microservice) within the distributed application. At operation 602, an indication to unassign a tag is received from a user interface. This user interface may be associated with the service that is performing the method. At operation 604, the assignment is removed from the local data store associated with the local tag library. At operation 606, an event for the unassigning of the tag is generated and broadcast to other services, including a tag management service, of the distributed application via an EM component.

While not pictured, when the other services receive the event for the unassignment of the tag, they likewise delete the assignment from their own respective tag library data stores. Furthermore, when the tag management service specifically receives the event, it checks to determine whether the assignment getting deleted was the last one for the respective tag. If it is, then it automatically initiates the process to delete the tag (and updates the services with the deletion).

It should also be noted that is possible to unassign a list of tags instead of just one tag using the same process, with the list of assignments to be deleted being sent with the event.

As mentioned earlier, periodically the tag management service generates a tag sync message to all services in the distributed application. This initiates a process on each of the services in the distributed application that receive the tag sync message.

Figure 7:
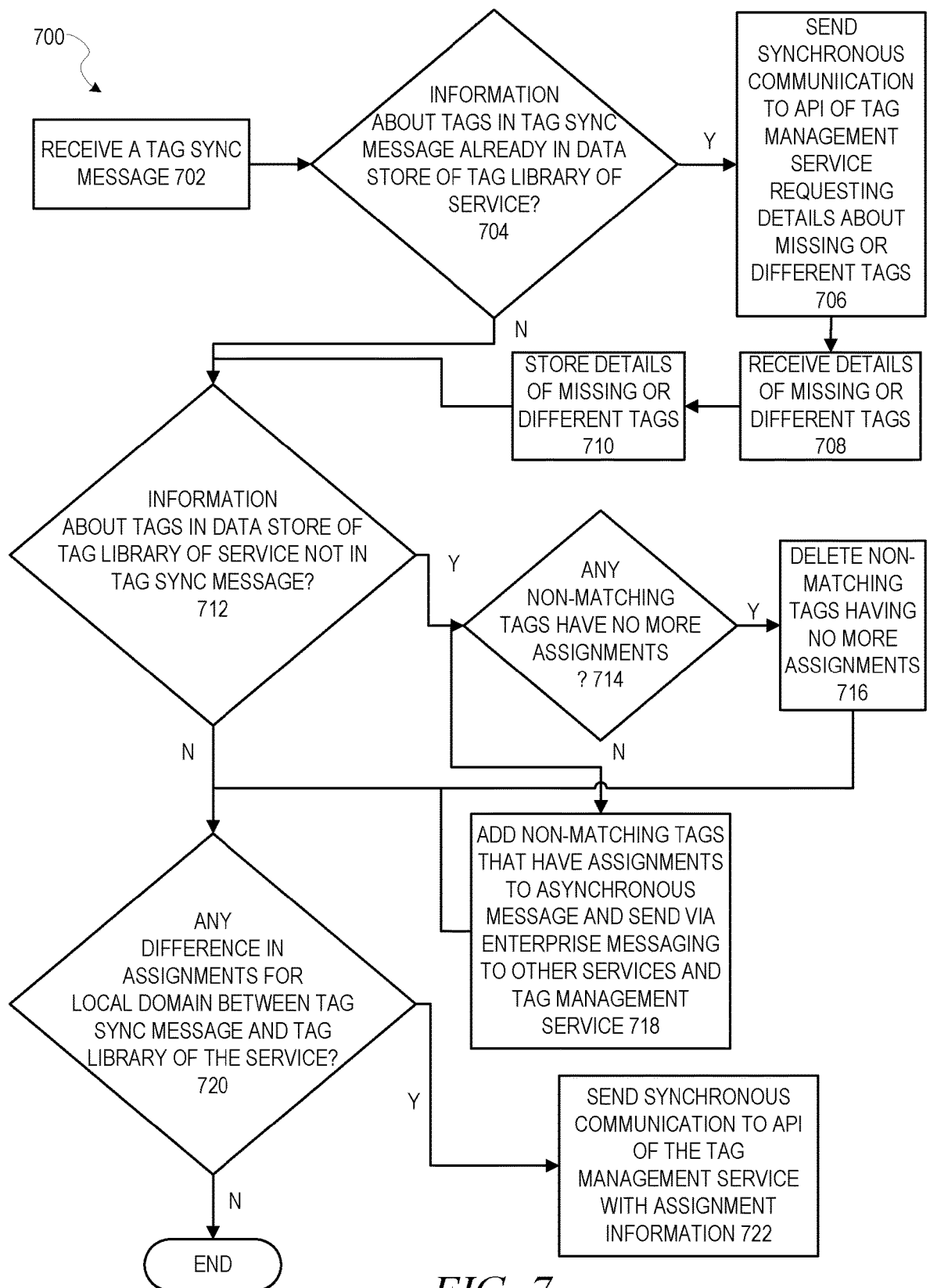
FIG. 7 is a flow diagram illustrating a method of handling a tag sync message, in accordance with an example embodiment.

FIG. 7 is a flow diagram illustrating a method 700 of handling a tag sync message, in accordance with an example embodiment. The method 700 may be performed by a tag library in each service that receives the tag sync message. At operation 702, the tag sync message is received. The tag sync message may include information about all the tags and assignments currently stored by a tag library of the tag management service. More particularly, for each tag, the tag sync message may contain the tag identification and a hash value of all attributes of the tag. This combination of tag identification and hash represents a tag fingerprint for the tag. For each domain, the tag sync message may contain an identification of the domain of the assignment and a hash of all the assignments, with each assignment being a concatenation of an entity type, an entity identification, and all tag identifications for the tags associated with the entity corresponding to the entity identification. As described above, these assignments may be sorted in a particular order, such as alphabetically according to entity type and entity identification, and the tag identifications may also be similarly sorted. This combination of domain identification and hash represents an assignments fingerprint for the domain.

At operation 704, it is determined if the information about the tags in the tag sync message is already contained in a data store of the tag library of the service handling the tag sync message. This may include determining whether the tag fingerprint for each tag identified in the tag sync message matches a tag fingerprint in the data store of the tag library of the service. If it does not (because either the tag identifications do not match, due to the tag being missing from the tag library of the service, or the tag hashes do not match, due to the tag attributes being different than in the tag library of the service), then the tag management service has a tag that the service handling the tag sync message does not. In that case, at operation 706, a synchronous communication is sent to an API of the tag management service requesting details of each missing (or different, due to having different attributes) tags. At operation 708, the details of each missing (or different) tag are received. At operation 710, the details of each missing (or different) tag are stored in the tag library of the service.

At operation 712, it is determined if there is any information about tags stored in the data store of the tag library of the service handling the tag sync message that is not in the tag sync message. This may include determining whether the tag fingerprint for each tag in the tag library of the service matches a tag fingerprint in the tag sync message. If it does not (because either the tag identifications do not match, due to the tag being missing from the tag sync message, or the tag hashes do not match, due to the tag attributes being different than in the tag sync message), then the tag library of the service handling the tag sync message has a tag that the tag management service does not. In that case, at operation 714, it is determined if any such non-matching tags have no more assignments in the tag library of the service. If so, then at operation 716 any such non-matching tags are deleted from the tag library of the service. At operation 718, any non-matching tags that have assignments in the tag library of the service are added to an asynchronous message and sent via enterprise messaging to any other services, and the tag management service, in the distributed application (so that they can add the tag to their local tag library data stores).

At operation 720, it is determined if there are any differences in assignments for a local domain between the information in the tag sync message and the information in the data store of the tag library of the service. This may be determined by comparing the assignments fingerprint for the domain between the data store of the tag library of the service and the tag sync message. If any differences are found, then at operation 722, a synchronous communication is sent to an API of the tag management service notifying the tag management service of the information about the assignments for the domain from the data store of the tag library of the service (i.e., the correct assignments, as found in the local data store). This causes the tag management service to overwrite its own assignment information in its own local data store of its own tag library with this correct assignment information.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
  accessing, at a first service in a distributed application, a tag sync message from a tag management service of the distributed application, the tag sync message comprising information about tags and information about assignments, each tag being a piece of text and each assignment being an indication that one or more tags have been associated with an entity in the distributed application;
  based on a determination that information about a first tag, contained in the tag sync message, is not contained in a data store of a tag library of the first service, sending a synchronous communication to the tag management service to obtain details about the first tag and storing the details about the first tag in the data store of the tag library of the first service; and
  based on a determination that there is a difference between assignment information contained in contained in the tag sync message and assignment information contained in a data store of a tag library of the first service, sending a synchronous communication to an Application Program Interface (API) of the tag management service to cause the tag management service to update its own data store of its own tag library with the assignment information contained in the data store of the tag library of the first service.

Example 2. The system of Example 1, wherein the operations further comprise:
  in response to a determination that information about a second tag, contained in the data store of the tag library of the first service, is not contained in the tag sync message, sending a synchronous communication to at least a second service and the tag management service in the distributed application with the information about the second tag, causing at least the second service and the tag management service to add the information about the second tag into their own respective data stores of their own respective tag libraries;

Example 3. The system Example 2, wherein the information about the second tag does not contain zero information about assignments and the operations further comprise:
  in response to a determination that information about a third tag, contained in the data store of the tag library of the first service, is not contained in the tag sync message and that the information about the third tag contains zero information about assignments, deleting the information about the third tag from the data store of the tag library of the first service.

Example 4. The system of any of Examples 1-3, wherein an entity is a data object.

Example 5. The system of any of Examples 1-4, wherein the information about tags includes, for each tag, a tag identification and a hash of a concatenation of all attributes of the tag.

Example 6. The system of Example 5, wherein the concatenation of all attributes of the tag is ordered according to a specific ordering scheme.

Example 7. The system of any of Examples 1-6, wherein the information about assignments includes, for at least one domain of the service, a domain identification and a hash of a concatenation of each piece of assignment information in the domain.

Example 8. The system of Example 7, wherein each piece of assignment information includes an entity type of an entity to which the assignment applies, an entity identification of the entity to which the assignment applies, and a list of tag identifications of tags associated with the entity to which the assignment applies.

Example 9. The system of Example 8, wherein the entity type and entity identification are ordered according to a specific ordering scheme.

Example 10. The system of Examples 8 or 9, wherein the list of tag identifications of tags associated with the entity to which the assignment applies is ordered according to a specific ordering scheme.

Example 11. A method comprising:
accessing, at a first service in a distributed application, a tag sync message from a tag management service of the distributed application, the tag sync message comprising information about tags and information about assignments, each tag being a piece of text and each assignment being an indication that one or more tags have been associated with an entity in the distributed application;
based on a determination that information about a first tag, contained in the tag sync message, is not contained in a data store of a tag library of the first service, sending a synchronous communication to the tag management service to obtain details about the first tag and storing the details about the first tag in the data store of the tag library of the first service; and
based on a determination that there is a difference between assignment information contained in contained in the tag sync message and assignment information contained in a data store of a tag library of the first service, sending a synchronous communication to an Application Program Interface (API) of the tag management service to cause the tag management service to update its own data store of its own tag library with the assignment information contained in the data store of the tag library of the first service.

Example 12. The method of Example 11, further comprising:
in response to a determination that information about a second tag, contained in the data store of the tag library of the first service, is not contained in the tag sync message, sending a synchronous communication to at least a second service and the tag management service in the distributed application with the information about the second tag, causing at least the second service and the tag management service to add the information about the second tag into their own respective data stores of their own respective tag libraries;

Example 13. The method of Example 12, wherein the information about the second tag does not contain zero information about assignments and the method further comprises:
in response to a determination that information about a third tag, contained in the data store of the tag library of the first service, is not contained in the tag sync message and that the information about the third tag contains zero information about assignments, deleting the information about the third tag from the data store of the tag library of the first service.

Example 14. The method of any of Examples 11-13, wherein an entity is a data object.

Example 15. The method of any of Examples 11-14, wherein the information about tags includes, for each tag, a tag identification and a hash of a concatenation of all attributes of the tag.

Example 16. The method of Example 15, wherein the concatenation of all attributes of the tag is ordered according to a specific ordering scheme.

Example 17. The method of any of Examples 11-16, wherein the information about assignments includes, for at least one domain of the service, a domain identification and a hash of a concatenation of each piece of assignment information in the domain.

Example 18. The method of Example 17, wherein each piece of assignment information includes an entity type of an entity to which the assignment applies, an entity identification of the entity to which the assignment applies, and a list of tag identifications of tags associated with the entity to which the assignment applies.

Example 19. The method Example 18, wherein the entity type and entity identification are ordered according to a specific ordering scheme.

Example 20. A non-transitory machine-readable medium storing instructions which, when executed by one or more processors, cause the one or more processors to perform operations comprising:
accessing, at a first service in a distributed application, a tag sync message from a tag management service of the distributed application, the tag sync message comprising information about tags and information about assignments, each tag being a piece of text and each assignment being an indication that one or more tags have been associated with an entity in the distributed application;
based on a determination that information about a first tag, contained in the tag sync message, is not contained in a data store of a tag library of the first service, sending a synchronous communication to the tag management service to obtain details about the first tag and storing the details about the first tag in the data store of the tag library of the first service; and
based on a determination that there is a difference between assignment information contained in contained in the tag sync message and assignment information contained in a data store of a tag library of the first service, sending a synchronous communication to an Application Program Interface (API) of the tag management service to cause the tag management service to update its own data store of its own tag library with the assignment information contained in the data store of the tag library of the first service.

Figure 8:
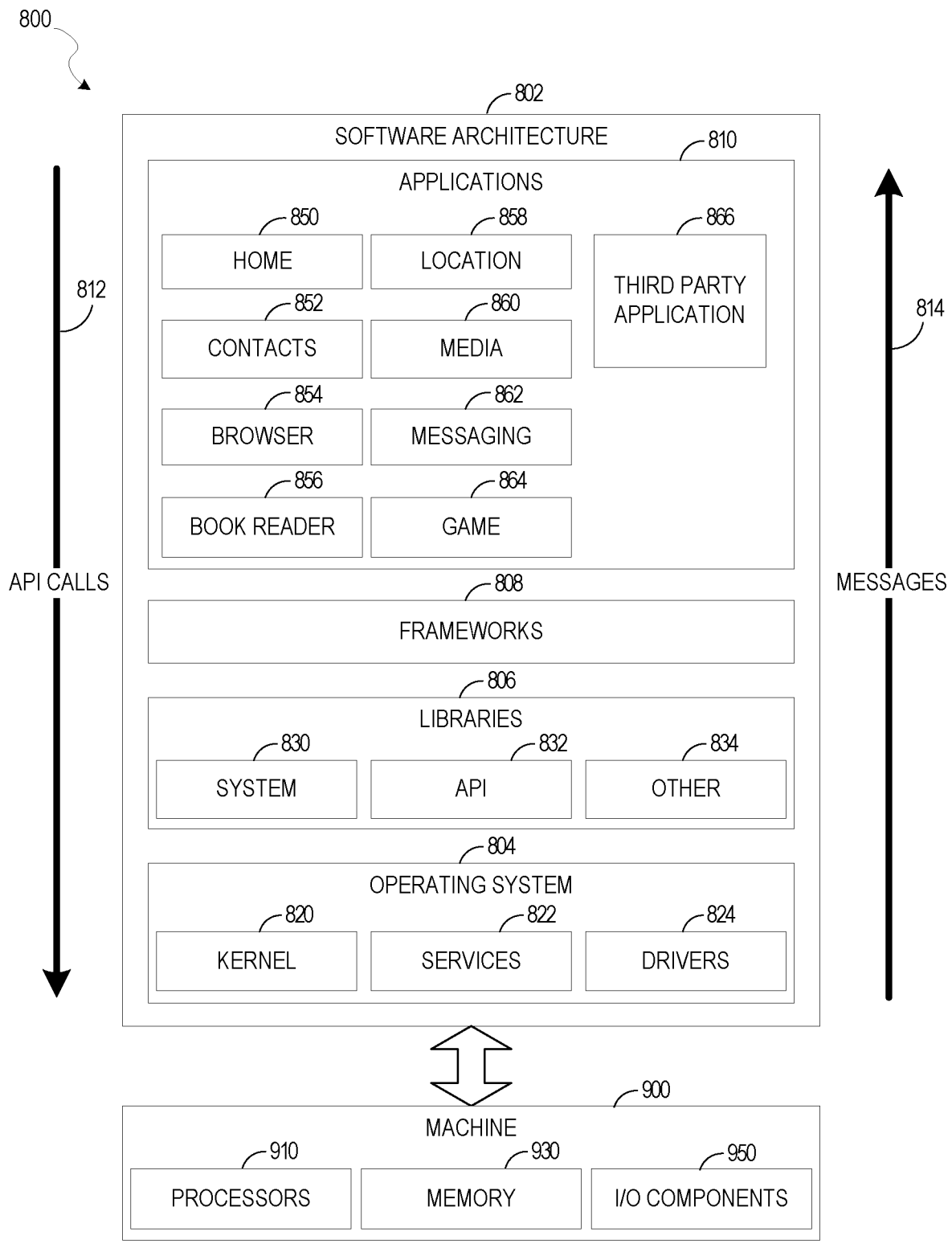
FIG. 8 is a block diagram illustrating an architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
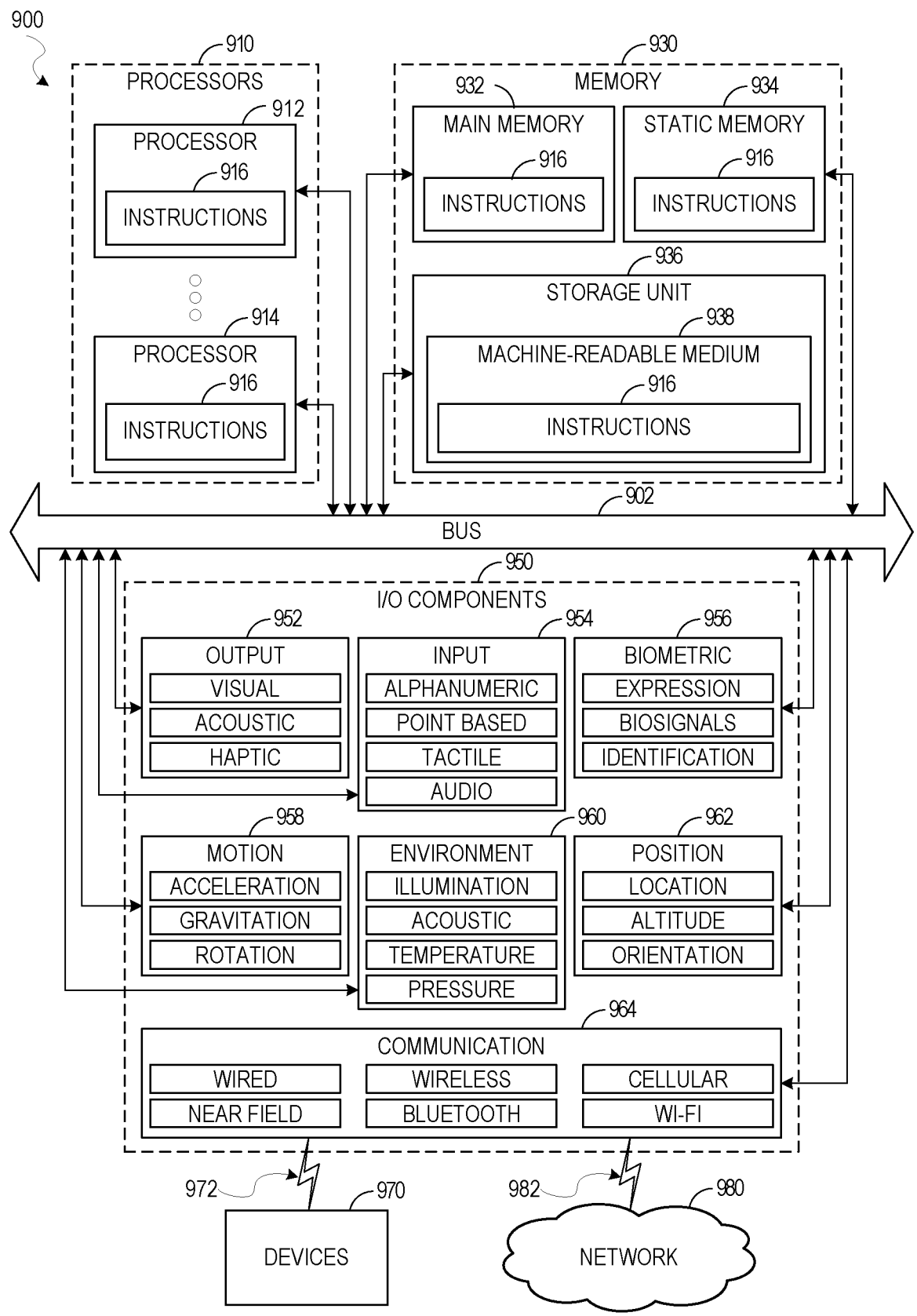
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods of FIGS. 3-7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing, at a first service in a distributed application, a tag sync message from a tag management service of the distributed application, the tag sync message comprising information about tags and information about assignments, each tag being a piece of text and each assignment being an indication that one or more tags have been associated with an entity in the distributed application;
   based on a determination that information about a first tag, contained in the tag sync message, is not contained in a data store of a tag library of the first service, sending a synchronous communication to the tag management service to obtain details about the first tag and storing the details about the first tag in the data store of the tag library of the first service; and
   based on a determination that there is a difference between assignment information contained in contained in the tag sync message and assignment information contained in a data store of a tag library of the first service, sending a synchronous communication to an Application Program Interface (API) of the tag management service to cause the tag management service to update its own data store of its own tag library with the assignment information contained in the data store of the tag library of the first service.

2. The system of claim 1, wherein the operations further comprise:
   in response to a determination that information about a second tag, contained in the data store of the tag library of the first service, is not contained in the tag sync message, sending a synchronous communication to at least a second service and the tag management service in the distributed application with the information about the second tag, causing at least the second service and the tag management service to add the information about the second tag into their own respective data stores of their own respective tag libraries.

3. The system of claim 2, wherein the information about the second tag does not contain zero information about assignments and the operations further comprise:
   in response to a determination that information about a third tag, contained in the data store of the tag library of the first service, is not contained in the tag sync message and that the information about the third tag contains zero information about assignments, deleting the information about the third tag from the data store of the tag library of the first service.

4. The system of claim 1, wherein an entity is a data object.

5. The system of claim 1, wherein the information about tags includes, for each tag, a tag identification and a hash of a concatenation of all attributes of the tag.

6. The system of claim 5, wherein the concatenation of all attributes of the tag is ordered according to a specific ordering scheme.

7. The system of claim 1, wherein the information about assignments includes, for at least one domain of the service, a domain identification and a hash of a concatenation of each piece of assignment information in the domain.

8. The system of claim 7, wherein each piece of assignment information includes an entity type of an entity to which the assignment applies, an entity identification of the entity to which the assignment applies, and a list of tag identifications of tags associated with the entity to which the assignment applies.

9. The system of claim 8, wherein the entity type and entity identification are ordered according to a specific ordering scheme.

10. The system of claim 8, wherein the list of tag identifications of tags associated with the entity to which the assignment applies is ordered according to a specific ordering scheme.

11. A method comprising:
accessing, at a first service in a distributed application, a tag sync message from a tag management service of the distributed application, the tag sync message comprising information about tags and information about assignments, each tag being a piece of text and each assignment being an indication that one or more tags have been associated with an entity in the distributed application;
based on a determination that information about a first tag, contained in the tag sync message, is not contained in a data store of a tag library of the first service, sending a synchronous communication to the tag management service to obtain details about the first tag and storing the details about the first tag in the data store of the tag library of the first service; and
based on a determination that there is a difference between assignment information contained in contained in the tag sync message and assignment information contained in a data store of a tag library of the first service, sending a synchronous communication to an Application Program Interface (API) of the tag management service to cause the tag management service to update its own data store of its own tag library with the assignment information contained in the data store of the tag library of the first service.

12. The method of claim 11, further comprising:
in response to a determination that information about a second tag, contained in the data store of the tag library of the first service, is not contained in the tag sync message, sending a synchronous communication to at least a second service and the tag management service in the distributed application with the information about the second tag, causing at least the second service and the tag management service to add the information about the second tag into their own respective data stores of their own respective tag libraries.

13. The method of claim 12, wherein the information about the second tag does not contain zero information about assignments and the method further comprises:
in response to a determination that information about a third tag, contained in the data store of the tag library of the first service, is not contained in the tag sync message and that the information about the third tag contains zero information about assignments, deleting the information about the third tag from the data store of the tag library of the first service.

14. The method of claim 11, wherein an entity is a data object.

15. The method of claim 11, wherein the information about tags includes, for each tag, a tag identification and a hash of a concatenation of all attributes of the tag.

16. The method of claim 15, wherein the concatenation of all attributes of the tag is ordered according to a specific ordering scheme.

17. The method of claim 11, wherein the information about assignments includes, for at least one domain of the service, a domain identification and a hash of a concatenation of each piece of assignment information in the domain.

18. The method of claim 17, wherein each piece of assignment information includes an entity type of an entity to which the assignment applies, an entity identification of the entity to which the assignment applies, and a list of tag identifications of tags associated with the entity to which the assignment applies.

19. The method of claim 18, wherein the entity type and entity identification are ordered according to a specific ordering scheme.

20. A non-transitory machine-readable medium storing instructions which, when executed by one or more processors, cause the one or more processors to perform operations comprising:
accessing, at a first service in a distributed application, a tag sync message from a tag management service of the distributed application, the tag sync message comprising information about tags and information about assignments, each tag being a piece of text and each assignment being an indication that one or more tags have been associated with an entity in the distributed application;
based on a determination that information about a first tag, contained in the tag sync message, is not contained in a data store of a tag library of the first service, sending a synchronous communication to the tag management service to obtain details about the first tag and storing the details about the first tag in the data store of the tag library of the first service; and
based on a determination that there is a difference between assignment information contained in contained in the tag sync message and assignment information contained in a data store of a tag library of the first service, sending a synchronous communication to an Application Program Interface (API) of the tag management service to cause the tag management service to update its own data store of its own tag library with the assignment information contained in the data store of the tag library of the first service.

* * * * *